United States Patent
Boutcher et al.

(10) Patent No.: US 10,091,359 B1
(45) Date of Patent: Oct. 2, 2018

(54) APPARATUS, METHOD, AND COMPUTER PROGRAM FOR OPTIMIZING COMMUNICATION

(71) Applicant: West Corporation, Omaha, NE (US)

(72) Inventors: James K. Boutcher, Omaha, NE (US); Bruce Pollock, Omaha, NE (US)

(73) Assignee: West Corporation, Omaha, NE (US)

( * ) Notice: Subject to any disclaimer, the term of this patent is extended or adjusted under 35 U.S.C. 154(b) by 0 days.

(21) Appl. No.: 13/873,495

(22) Filed: Apr. 30, 2013

(51) Int. Cl.
*H04M 3/00* (2006.01)
*H04M 3/51* (2006.01)

(52) U.S. Cl.
CPC ................... *H04M 3/5183* (2013.01)

(58) Field of Classification Search
CPC .... H04M 3/5191; H04M 3/51; H04M 3/5166; H04M 3/523; H04M 3/5232; H04M 3/5183; H04M 3/5175; H04M 2203/2011
USPC .......................... 379/265.09, 265.01, 266.01
See application file for complete search history.

(56) References Cited

U.S. PATENT DOCUMENTS

| | | | | |
|---|---|---|---|---|
| 2005/0188110 | A1* | 8/2005 | Hollatz | H04L 29/06027 709/244 |
| 2009/0168989 | A1* | 7/2009 | Perlmutter | H04M 3/4217 379/265.09 |
| 2013/0195258 | A1* | 8/2013 | Atef | H04L 67/34 379/88.01 |
| 2013/0343535 | A1* | 12/2013 | Singh et al. | 379/265.09 |
| 2014/0119531 | A1* | 5/2014 | Tuchman et al. | 379/265.09 |
| 2014/0119532 | A1* | 5/2014 | Marghescu et al. | 379/265.09 |
| 2014/0126713 | A1* | 5/2014 | Ristock | H04M 3/5231 379/265.09 |
| 2014/0146959 | A1* | 5/2014 | Spence et al. | 379/265.09 |
| 2014/0161241 | A1* | 6/2014 | Baranovsky | H04M 3/51 379/142.05 |

\* cited by examiner

*Primary Examiner* — Rasha Al Aubaidi

(57) ABSTRACT

Communication between callers and call center agents may be optimized. A request message may be transmitted to an application services module to connect with an agent associated with the selection. A contact number of a proxy server may be received from the application service module. The contact number may be utilized to connect with the agent via the proxy server.

20 Claims, 5 Drawing Sheets

APPARATUS, METHOD, AND COMPUTER PROGRAM FOR OPTIMIZING COMMUNICATION

FIELD

The present invention generally relates to optimizing communication and, more particularly, to optimizing communication between callers and call center agents.

BACKGROUND

When a caller, such as a customer, calls an agent of a company, he or she may want to speak with the agent to resolve his or her issue or answer his or her question. Yet, despite the fact that the caller wants to speak with the agent, companies often make it difficult to reach the agent in a quick and efficient manner. For example, a company may construct a confusing, lengthy interactive voice response (IVR) menu preventing the caller from efficiently reaching the agent.

Another issue a caller may face is that the call experience is often impersonal. For example, the agent may not know who the caller is or why he or she is calling. Thus, an apparatus, method, and computer program that optimizes communication between callers and call center agents may be beneficial.

SUMMARY

Certain embodiments of the present invention may provide solutions to the problems and needs in the art that have not yet been fully identified, appreciated, or solved by current IVR systems. For example, some embodiments of the present invention provide a quick, easy process for a caller to connect with an agent and, in some instances, the specific agent of the caller's choice is provided.

In an embodiment, an apparatus includes at least one processor and memory including computer program instructions. The computer program instructions, with the at least one processor, are configured to cause the apparatus to transmit a request message to an application services module to connect with an agent associated with the selection. The computer program instructions, with the at least one processor, are further configured to cause the apparatus to receive a contact number of a proxy server from the application service module. The contact number is utilized to connect with the agent via the proxy server.

In another embodiment, an apparatus is provided. The apparatus includes at least one processor and memory including computer program instructions. The computer program instructions, with the at least one processor, are configured to cause the apparatus to receive a request message from a mobile device. The message request includes a request to connect with an agent at a call center. The computer program instructions, with the at least one processor, are also configured to transmit a contact number to the mobile device to allow the mobile device to connect with the agent via a proxy interactive voice response system.

In another embodiment, an apparatus is provided. The apparatus includes at least one processor and memory including computer program instructions. The computer program instructions, with the at least one processor, are configured to cause the apparatus to receive a request from a mobile device to connect with an agent at a call center, and query a system database for an agent contact number previously returned by a call routing engine. The computer program instructions, with the at least one processor, are further configured to cause the apparatus to connect the mobile device to the agent at the caller center using the agent contact number.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Embodiments of the present invention provide for a quick, easy process for a caller (e.g., customer) to connect with an agent and, in some instances, the specific agent of the caller's choice. In one embodiment, the caller may download an application to his or her portable device, such as a mobile phone, allowing the caller to select the reason for the call from a visual menu. The application may then allow the caller to directly connect with the agent handing calls related to the caller's specific inquiry. For example, if the caller has a billing inquiry, the caller may be connected directly with an agent that handles billing inquiries. In some embodiments, after the call is complete, the caller may rank the performance of the agent, and indicate if the next time he or she calls, the caller would like to speak with the same agent, or a different agent if the same agent is not available. Stated differently, the application provides for quick, easy, personalized caller service interactions between the caller and the agent.

Figure 1:
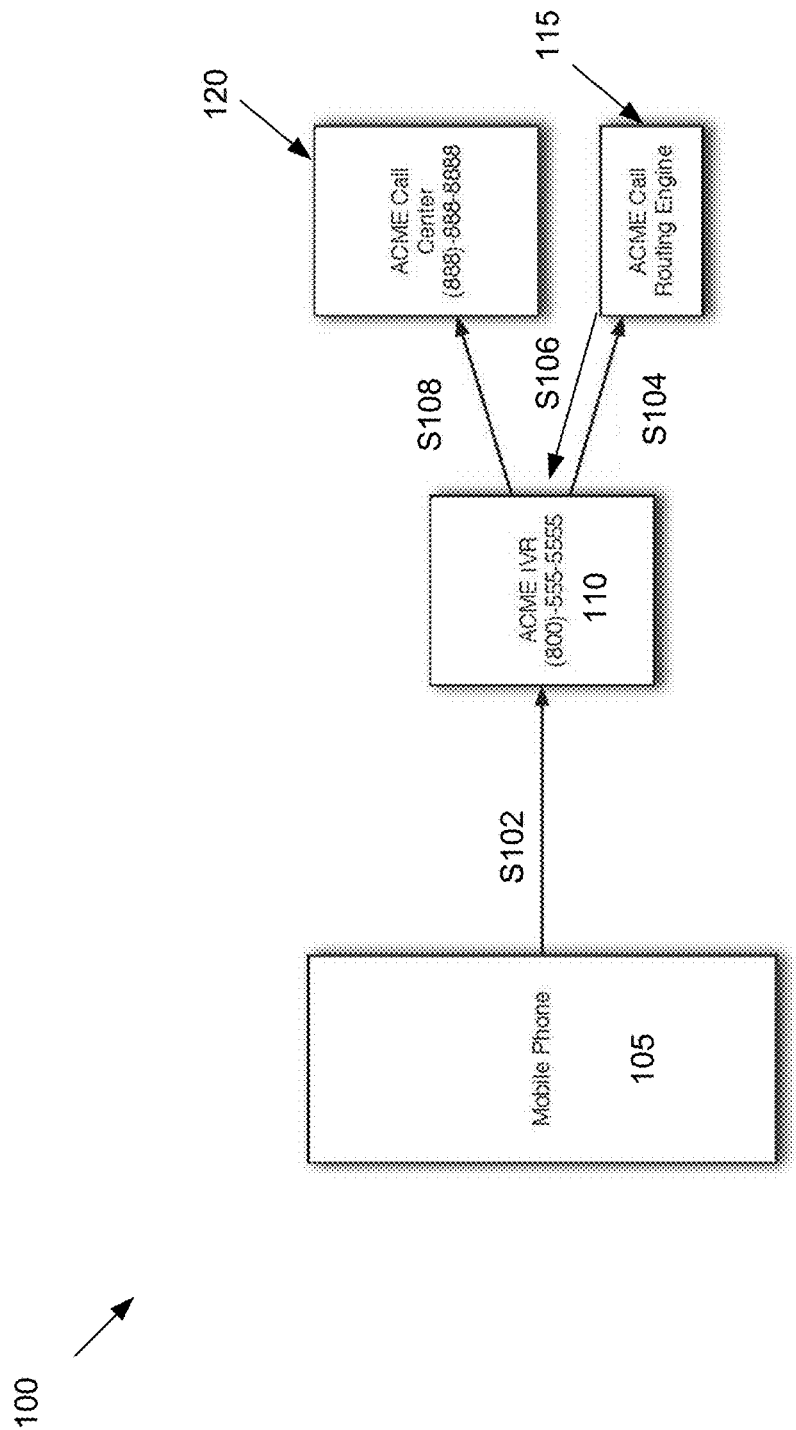
FIG. 1 is a flow diagram illustrating a conventional process for connecting a caller to an agent.

FIG. 1 is a flow diagram 100 illustrating a conventional process for connecting a caller to an agent. In the conventional process, a caller may use a mobile phone 105 to dial and connect S102 with an IVR system 110. In such a scenario, the caller must navigate through a menu of the IVR system by searching for an agent. After a lengthy process, the caller may find the appropriate menu selection, at which point IVR system 110 may request S104 the agent contact information from a call routing engine 115. Call routing engine 115 returns S106 the agent contact information to IVR system 110. IVR system 110 then transfers or routes S4 the call in order to connect the caller with the agent 120.

This process is not only time consuming, but also frustrating to the caller. For example, not only does not caller have to go through a lengthy process to find the agent, but the agent may not know the exact problem or inquiry that the caller has.

Figure 2:
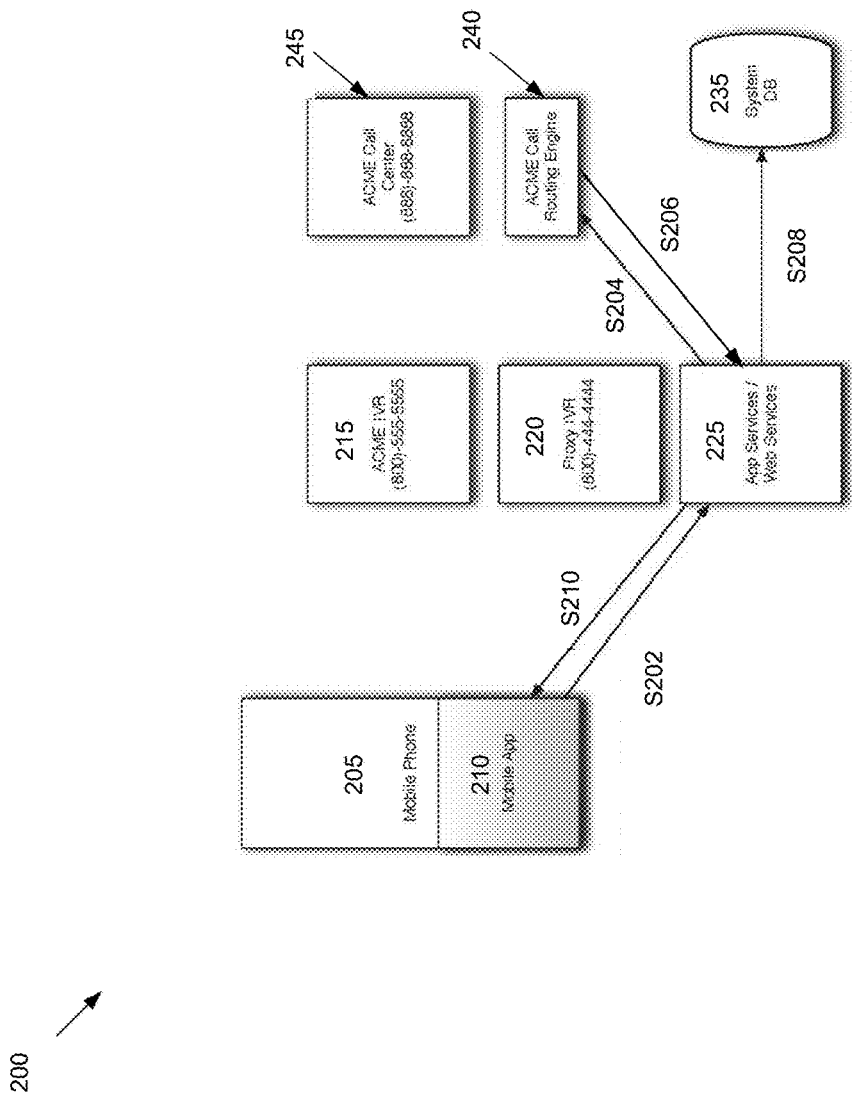
FIG. 2 is a flow diagram illustrating a process for retrieving agent contact information, according to an embodiment of the present invention

FIG. 2 is a flow diagram 200 illustrating a process for retrieving agent contact information, according to an embodiment of the present invention. In this embodiment, a mobile phone 205 may include a mobile application 210 that may be executed by at least one processor. The mobile application, when launched, may display a menu to the user (hereinafter "caller") of mobile phone 205. The menu may include a plurality of selection options for the caller to choose from. For example, the caller may select billing inquiry, technical support, etc.

Based on the caller selection, mobile phone 205 transmits S202 a request to connect with an agent at a call center 245. The request may indicate that the caller is requesting to speak with an agent for a particular matter. In certain embodiments, the request may include identifier information to identify the caller of mobile application 210, as well as the type of issue the caller wishes to speak to the agent about. Also, in some embodiments, a client indicator may also be included in the request.

An application service (web service) module 225 may receive the request and transmit S204 a request to a routing engine 240 for an agent. In this embodiment, web service may module 225 may interface with mobile application 210, and application service module 225 provides connectivity between mobile application 210, routing engine 240, system database 235, etc.

In response to the request, call routing engine 240 may transmit S206 contact information, including a phone number, of the agent of call center 245 to application services module 225. In certain embodiments, call routing engine 240 may determine, using a logic program, the appropriate agent based on the type of issue the caller is experiencing, the skillset of the agents, the availability of the agents, the utilization of the agents, etc. It should be appreciated that the phone number of the agent returned to application service module 225 is the real number that will be used to transfer the call. As discussed below, the phone number of the agent will be stored in system database 235, allowing proxy IVR 220 to access the phone number and connect the caller to the agent of call center 245. This allows the phone number to be masked, preventing the caller of mobile application 210 from viewing the real phone number of the agent.

Application service module 225 stores S208 in a system database 235 contact information of the caller and the contact information of the agent. In certain embodiments, the contact information of the agent is associated with the contact information of the caller. Further, caller contact information may include caller name, location, and caller contact number, and agent contact information may include the name of the agent, call center location of the agent, and the agent contact number.

Upon storing the contact information of the caller and agent in system database 235, application service module 225 transmits S210 a contact number of proxy IVR 220 to mobile application 210 in order for mobile phone 205 to connect with proxy IVR 220. It should be appreciated that in some embodiments, the contact number of proxy IVR 220 is a predetermined number that remains unchanged. This number may be stored in system database 235 or in another database as would be appreciated by a person of ordinary skill in the art.

Figure 3:
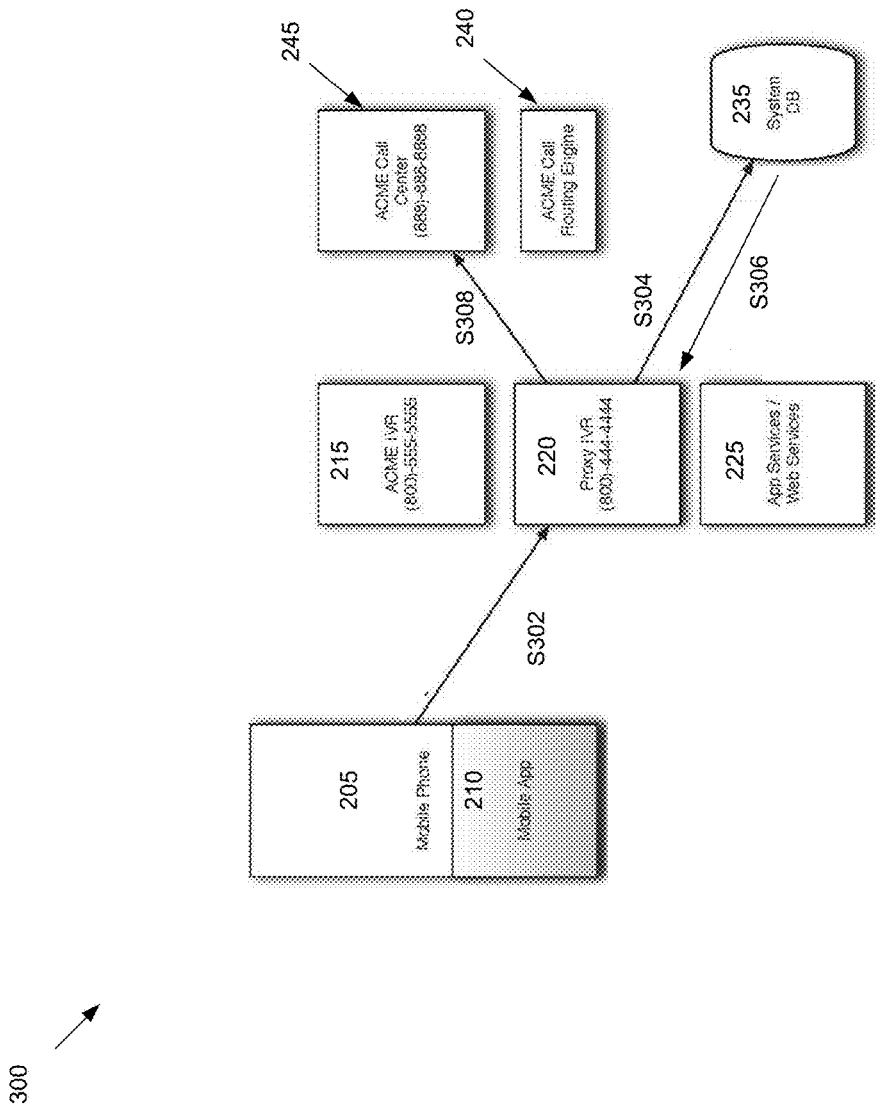
FIG. 3 is a flow diagram illustrating a process for connecting with an agent, according to an embodiment of the present invention

FIG. 3 is a flow diagram 300 illustrating a process for connecting with an agent, according to an embodiment of the present invention. In this embodiment, mobile application 210 causes mobile phone 205 to dial the phone number provided by application service module 225, and connect S302 with proxy IVR 220.

Proxy IVR 220 searches S304 system database 235 for the contact information of the caller. Based on the searched results, contact information of an agent of call center 245 associated with the contact information of the caller is returned S306 to proxy IVR 220. Using the contact information of the agent, proxy IVR 220 connects S308 the caller of mobile phone 205 with the agent of call center 245.

It should be appreciated that in some embodiments, proxy IVR 220 may discard the record to prevent any attempts to dial back into proxy IVR 220 by mobile phone 205. This prevents the caller from knowing the true contact information of the agent. For example, if a caller of mobile application 210 were to redial to proxy IVR 220, proxy IVR 220 may not connect the caller to the same agent since proxy IVR 220 discarded the record of the call. In certain embodiments, an error message may be transmitted to the mobile application 210 if the caller of mobile application 210 were to redial to proxy IVR 220.

This process also allows the caller to bypass the conventional IVR system 215, providing a more efficient and effective communication means to communicate with the agent.

In certain embodiments, at the end of a conversation with an agent, the call center system may send details of the agent who handled the call to the application services. The application services may then store this information in a system database. The mobile application, when detecting that the call is over, may prompt the caller to rate his or her experience with the agent. This rating system may be on a scale of 1 to 5, for example, or any type of rating system.

Figure 4:
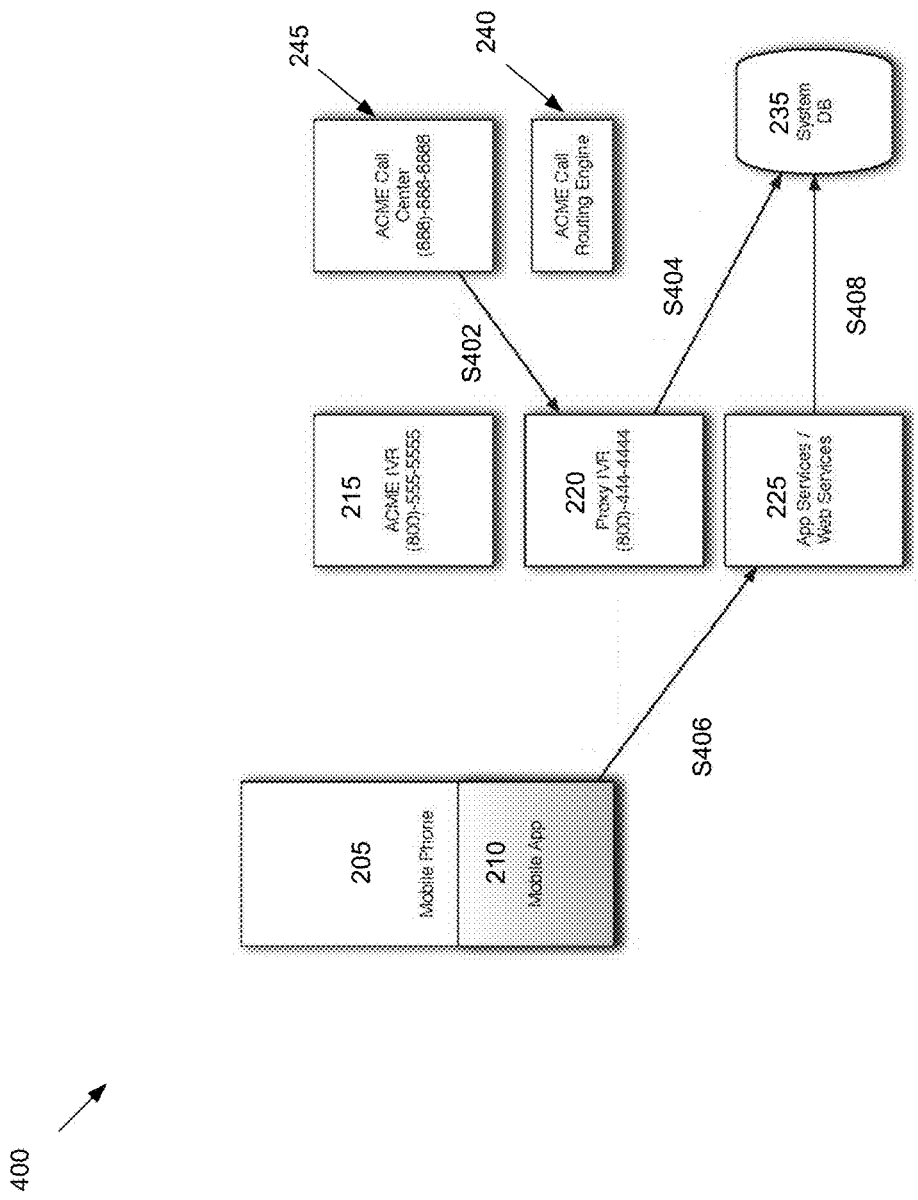
FIG. 4 is a flow diagram illustrating a process for obtaining agent feedback, according to an embodiment of the present invention.

FIG. 4 is a flow diagram 400 illustrating a process for obtaining agent feedback, according to an embodiment of the present invention. The process begins with proxy IVR 220 receiving S402 agent data from call center 245 when the call has completed. Proxy IVR 220 transmits S404 the agent data and call data to system database 235 for storage. The call data may include information related to the call between the caller and the agent. Call data may also identify the specific agent of call center 245.

When mobile application 210 detects that the call with the agent of call center 245 has been completed, mobile application 205 prompts the caller to rate his or her experience with the agent. Mobile application 210 then causes mobile phone 205 to transmit S406 an agent rating to application service module 225. Application service module 225 may store S408 the agent rating in system database 235, such that the agent rating is included in the contact information of the agent, and associated with the contact information of the caller. This allows the caller connect with a highly rated agent the next time the caller calls the call center.

Figure 5:
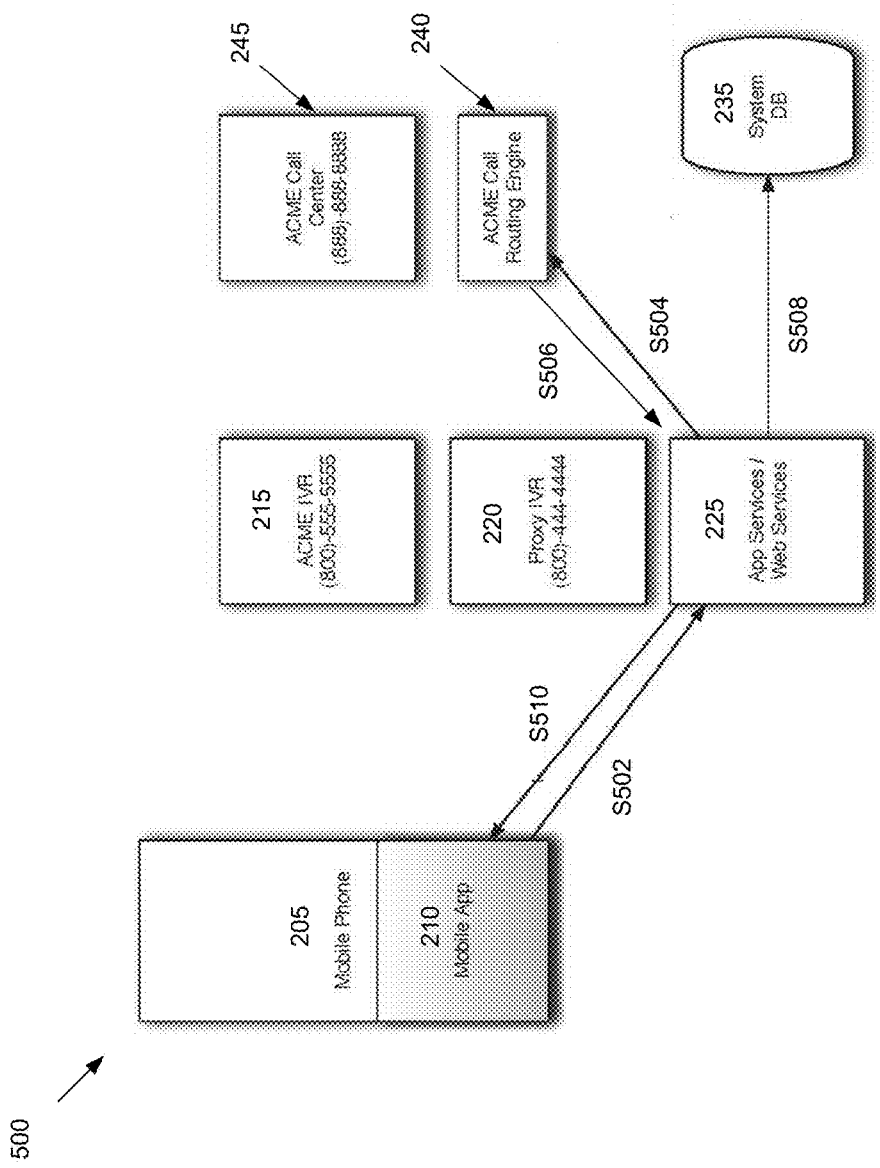
FIG. 5 is a flow diagram illustrating a process for routing the call to a preferred agent, according to an embodiment of the present invention.

In some embodiments, a caller of mobile application 210 may be routed to a preferred agent. FIG. 5 is a flow diagram 500 illustrating a process for routing the call to a preferred agent, according to an embodiment of the present invention. The process begins with mobile application 210 causing mobile phone 205 to transmit S502 a request to application services module 225 for the caller to speak with an agent. For example, depending on the type of issue, mobile application 210 may query the caller whether he or she wishes to speak with the same agent. In another example, depending on the type of issue, mobile application 210 may cause mobile phone 205 to transmit a request for the caller to speak with the same agent.

Application services module 225, in response, transmits S504 a request for an agent to call routing engine 245. The request may include a request for the highest rated agent previously rated by the caller, or in some embodiments, the best rated and available agents.

In some embodiments, routing engine 240 may retrieve a list of preferred agents including their ratings. Mobile application 210, or in certain embodiments, application services module 225 and/or system database 235 may determine the highest rated agent.

Application services module 225 receives S506 a phone number of the agent of call center 245 in response to the request from call routing engine 240. Application services module 225 may also receive survey results from call routing engine 240 in some embodiments.

Application services module 225 stores S508 in system database 235 contact information of the caller, the phone number of the agent, and survey results (e.g., rating) of the agent. A phone number of proxy IVR 220 is transmitted S510 from application services module 225 to mobile phone 205. As discussed above, the phone number of proxy IVR 220 may be pre-stored in system database 235. This allows the caller to connect with the agent of his or her choice quickly and efficiently by using a process similar to the one described in FIG. 3.

The method steps shown in FIGS. 2-5 may be performed, in part, by a computer program, encoding instructions for a nonlinear adaptive processor to cause at least the methods described in FIGS. 2-5 to be performed by the apparatuses discussed herein. The computer program may be embodied on a non-transitory computer readable medium. The computer readable medium may be, but is not limited to, a hard disk drive, a flash device, a random access memory, a tape, or any other such medium used to store data. The computer program may include encoded instructions for controlling the nonlinear adaptive processor to implement the method described in FIGS. 2-5, which may also be stored on the computer readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an application specific integrated circuit ("ASIC").

It will be readily understood that the components of the invention, as generally described and illustrated in the figures herein, may be arranged and designed in a wide variety of different configurations. Thus, the detailed description of the embodiments is not intended to limit the scope of the invention as claimed, but is merely representative of selected embodiments of the invention.

The features, structures, or characteristics of the invention described throughout this specification may be combined in any suitable manner in one or more embodiments. For example, the usage of "certain embodiments," "some embodiments," or other similar language, throughout this specification refers to the fact that a particular feature, structure, or characteristic described in connection with an embodiment may be included in at least one embodiment of the invention. Thus, appearances of the phrases "in certain embodiments," "in some embodiments," "in other embodiments," or other similar language, throughout this specification do not necessarily all refer to the same embodiment or group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations that are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An apparatus, comprising:
at least one processor; and
memory comprising computer program instructions, wherein
the computer program instructions, with the at least one processor, are configured to cause the apparatus to:
transmit a request message to an application services module to connect with an agent when a selection is made on a mobile application stored in the memory of the apparatus, and made prior to connecting with the application services module,
receive a contact number of a proxy server from the application service module, and
connect with the proxy server using the contact number provided by the application service module, wherein the connection causes the proxy server to access a system database to search for caller identification to retrieve a phone number of the agent and connect a user of the mobile application to the agent, wherein
the proxy server discards one or more records related to the connection of the user of the mobile application with the agent, preventing the user of the mobile application from redialing and connecting with the agent.

2. The apparatus of claim 1, wherein the computer program instructions, with the at least one processor, are further configured to cause the apparatus to receive a selection by a user of the apparatus, and the selection is from one of a plurality of menu options displayed on the apparatus.

3. The apparatus of claim 1, wherein the computer program instructions, with the at least one processor, are further configured to cause the apparatus to transmit a connection request message to the proxy server to connect with the agent.

4. The apparatus of claim 1, wherein the computer program instructions, with the at least one processor, are further configured to cause the apparatus to detect completion of a call with the agent, and request for a user of the apparatus to rate the agent.

5. The apparatus of claim 4, wherein the computer program instructions, with the at least one processor, are further configured to cause the apparatus to receive a rating of the agent, and transmit the rating of the agent to an application services module for storage in a system database.

6. The apparatus of claim 1, wherein the request message identifies an agent with a highest rated rating.

7. The apparatus of claim 1, wherein the contact number of the proxy is associated with the agent having a highest rating.

8. An apparatus, comprising:
at least one processor; and memory comprising computer program instructions, wherein the computer program instructions, with the at least one processor, are configured to cause the apparatus to:

connect with, and receive a request message from, a mobile device after a user of the mobile device selects an option from a plurality of options on a mobile application stored on the mobile device, the message request comprising a request to connect with an agent at a call center, transmit a contact number of the proxy server to the mobile device, allowing the mobile device to connect with the agent by using the contact number of the proxy server, wherein the proxy server discards one or more records related to the connection of the user of the mobile application with the agent, preventing the user of the mobile device from redialing and connecting with the agent.

9. The apparatus of claim 8, wherein the computer program instructions, with the at least one processor, are further configured to cause the apparatus to transmit a call number request to a call routing engine.

10. The apparatus of claim 9, wherein the computer program instructions, with the at least one processor, are further configured to cause the apparatus to receive an agent call number from the call routing engine.

11. The apparatus of claim 10, wherein the computer program instructions, with the at least one processor, are further configured to cause the apparatus to store a caller identification of a mobile device and the agent call number in a system database.

12. The apparatus of claim 8, wherein the computer program instructions, with the at least one processor, are further configured to cause the apparatus to receive agent rating information from the mobile device.

13. The apparatus of claim 12, wherein the computer program instructions, with the at least one processor, are further configured to cause the apparatus to store the agent rating information in a system database.

14. The apparatus of claim 8, wherein the computer program instructions, with the at least one processor, are further configured to cause the apparatus to transmit a call number request to a call routing engine, the call number request comprising a request to connect with a previously highest rated agent.

15. The apparatus of claim 14, wherein the previously high rated agent is rated by the user of a mobile device during a previous connection.

16. The apparatus of claim 14, wherein the computer program instructions, with the at least one processor, are further configured to cause the apparatus to receive a previously highest rated agent contact number from a call routing engine.

17. An apparatus, comprising:

at least one processor; and memory comprising computer program instructions, wherein the computer program instructions, with the at least one processor, are configured to cause the apparatus to:

connect with, and receive a request from, a mobile device to connect with an agent at a call center after a user of the mobile device selects an option from a plurality of options on a mobile application stored on the mobile device, wherein the request comprises a request to speak with an agent, query a system database for an agent contact number previously returned by a call routing engine, the querying of the system database comprises searching for contact information of the user, and using the contact information of the user, to determine contact information of the agent associated with the contact information of the user, connect the user of the mobile device to the agent at the caller center using the determined contact number of the agent, wherein the proxy server discards one or more records related to the connection of the user of the mobile application with the agent, preventing the user of the mobile device from redialing and connecting with the agent.

18. The apparatus of claim 17, wherein query is performed based on a caller identification of the mobile device.

19. The apparatus of claim 17, wherein the computer program instructions, with the at least one processor, are further configured to cause the apparatus to store call information in a system database when the call between the mobile device and the agent is complete.

20. The apparatus of claim 19, wherein the call information comprises data related to the agent and data related to the mobile device.

* * * * *